(12) United States Patent
Kellner et al.

(10) Patent No.: US 12,315,950 B2
(45) Date of Patent: May 27, 2025

(54) BATTERY ARRANGEMENT FOR AN ELECTRIC VEHICLE

(71) Applicant: Dr. Ing. h.c. F. Porsche Aktiengesellschaft, Stuttgart (DE)

(72) Inventors: Philipp Kellner, Renningen (DE); Teiwen Fehse, Stuttgart (DE); Christopher Volkmer, Niefern-Öschelbronn (DE); Ralf Keller, Pforzheim (DE); Markus Grupp, Steinheim am Albuch (DE); Daniel Fink, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 560 days.

(21) Appl. No.: 17/841,753

(22) Filed: Jun. 16, 2022

(65) Prior Publication Data

US 2022/0407164 A1    Dec. 22, 2022

(30) Foreign Application Priority Data

Jun. 17, 2021    (DE) .................... 10 2021 115 668.8

(51) Int. Cl.

| | |
|---|---|
| *H01M 50/242* | (2021.01) |
| *B60L 50/64* | (2019.01) |
| *H01M 10/48* | (2006.01) |
| *H01M 50/204* | (2021.01) |
| *H01M 50/227* | (2021.01) |
| *H01M 50/231* | (2021.01) |
| *H01M 50/249* | (2021.01) |
| *B60K 1/04* | (2019.01) |

(52) U.S. Cl.
CPC ........... *H01M 50/242* (2021.01); *B60L 50/64* (2019.02); *H01M 10/482* (2013.01); *H01M 50/204* (2021.01); *H01M 50/227* (2021.01); *H01M 50/231* (2021.01); *H01M 50/249* (2021.01); *B60K 1/04* (2013.01); *B60K 2001/0438* (2013.01); *H01M 2220/20* (2013.01)

(58) Field of Classification Search
None
See application file for complete search history.

(56) References Cited

FOREIGN PATENT DOCUMENTS

| | | |
|---|---|---|
| DE | 102010024320 A1 | 12/2011 |
| DE | 102017206663 A1 | 10/2018 |
| DE | 102019207435 A1 | 11/2020 |

*Primary Examiner* — Carlos Barcena
(74) *Attorney, Agent, or Firm* — Buchanan Ingersoll & Rooney PC

(57) ABSTRACT

A battery arrangement for an electric vehicle including a battery housing and a plurality of battery cells. The battery cells are arranged in the battery housing. A protective plate is arranged on a side of the battery and faces toward a roadway. A deformation detection device includes at least one deformation sensor arranged at the protective plate. The protective plate is constructed of multiple layers and includes at least one first layer and one second layer separate from the first layer. The deformation detection device includes a first deformation sensor and a second deformation sensor. The first deformation sensor is arranged at the first layer of the multi-layer protective plate and the second deformation sensor is arranged at the second layer of the multi-layer protective plate.

11 Claims, 1 Drawing Sheet

BATTERY ARRANGEMENT FOR AN ELECTRIC VEHICLE

CROSS-REFERENCE TO RELATED APPLICATION

This application claims priority to German Patent Application No. 10 2021 115 668.8, filed Jun. 17, 2021, the content of such application being incorporated by reference herein in its entirety.

FIELD OF THE INVENTION

The invention relates to a battery arrangement for an electric vehicle with a battery that comprises a battery housing and a plurality of battery cells, wherein the battery cells are arranged in the battery housing, a protective plate that is arranged on a side of the battery that faces toward a roadway, and a deformation detection device comprising at least one deformation sensor, wherein the deformation sensor is arranged at the protective plate.

BACKGROUND OF THE INVENTION

Batteries are usually employed in an electric vehicle and serve as storage of electrical energy and to supply a drive unit with electrical energy when in driving operation. The batteries usually comprise a multiplicity of battery cells that are arranged in a battery housing and are electrically interconnected. Alternatively, the battery cells are divided into multiple battery modules, wherein the battery cells are electrically interconnected inside the battery modules, and the battery modules in turn are electrically interconnected.

To provide the appropriate electrical drive energy for a relatively high range of the electric vehicle, the batteries have a relatively large installation space due to the multiplicity of battery cells, while the batteries are usually arranged at the underbody of the electric vehicle since the necessary installation space is available at the underbody. The underbody batteries are usually protected from objects projected upward from the roadway by a protective plate, wherein, in spite of the protective plate, such objects could cause a deformation of the battery housing or could even penetrate through the battery housing whereby the battery cells could be damaged. The protective plate, here, is heavily deformed, or even penetrated, by the upwardly-projected object. Damage to the battery cells can result in the release of gas from the battery cells, even to the whole battery being set on fire.

Failure of the battery is usually recognized by a battery management system. This type of deformation, or this type of penetration, of the battery housing is, however, not immediately detected by the battery management system, in fact too late, since the affected battery cells may not yet be noticeably damaged. The battery cells may, however, be damaged to the extent that a failure in the near future must be feared, or that safety requirements are no longer maintained.

DE 10 2017 206 663 A1, which is incorporated by reference herein, for example, discloses an electric vehicle with an underbody battery, wherein the underbody battery is protected against objects projected upward from a roadway by a protective plate arranged between the underbody battery and the roadway. To increase the safety, the protective plate comprises a deformation sensor that performs active monitoring of the state of the protective plate and consequently immediately detects damage to the underbody battery through the detection of damage to the protective plate. The deformation sensor comprises an electrically conductive coating that is applied to the protective plate, while an evaluation circuit detects a change in the resistance of the deformation sensor. It is disadvantageous here that the deformation sensor only detects whether, and in what region, there is damage to the protective plate and, on the basis of this, immediately concludes that the battery has been damaged. With such a design, no conclusion can be drawn as to what extent damage to the battery is truly present and the extent of the damage to the battery. This gives rise to the risk that measures are taken, in particular that the electric vehicle is switched into an emergency running mode or fully switched off, although only slight damage to the protective plate, and no critical damage to the battery, is present.

SUMMARY OF THE INVENTION

Described herein is a battery arrangement with which the extent of the damage to the protective plate and to the battery can be ascertained reliably, and wherein measures can be introduced on that basis.

Because the protective plate is constructed of multiple layers and comprises at least one first layer and one second layer separate from the first layer, wherein the deformation detection device comprises a first deformation sensor and a second deformation sensor, wherein the first deformation sensor is arranged at the first layer of the multi-layer protective plate and the second deformation sensor is arranged at the second layer of the multi-layer protective plate, the extent of the impact of an object at the protective plate can be quantified, and appropriate measures introduced or recommended on that basis. The impact of the object here can be sufficiently slight that only the second layer, i.e. the layer arranged closest to the roadway, is deformed. In spite of the deformation of the protective plate, immediate measures do not have to be taken here, and the protective plate can be replaced at the next workshop visit. In the case of an impact of the object with a higher force, wherein a deformation is detected at both layers by the deformation sensors, depending on the stress caused by the deformation from the impact of the object, damage to the battery and, potentially, the extent of damage to the battery are concluded. From the knowledge of the stiffnesses of the individual layers, and the deformation ascertained at the individual layers, the stress from the impact of the object can be ascertained, and the stress acting on the battery estimated. On this basis it is possible to estimate whether a critical stress is present at the battery, and whether appropriate measures have to be introduced.

A cooling plate with a predefined stiffness could, furthermore, be arranged between the battery and the protective plate, wherein a flow of coolant through the cooling plate is monitored, for example by a pressure sensor. By monitoring the flow of coolant, damage to the battery can also be detected, since, due to damage to the cooling plate and the release of coolant caused thereby, possible damage to the battery can be concluded. The acquisition of the damage to the cooling plate can also be used to estimate the extent of the stress affecting the battery.

The availability of the electric vehicle can be significantly increased by such a design of the deformation detection device, since the electric vehicle can continue to be used for the usual driving operation with slight damage to the protective plate, and only in the case of critical damage to the protective plate and the battery must it be switched off or immediately brought to the workshop.

In one preferred embodiment, the first deformation sensor and/or the second deformation sensor are divided into different segments. The position of the deformation of the protective plate can thereby be localized, and corresponding measures, in particular switching off individual battery modules of the battery, introduced only in the segments where the critical deformation is detected.

Preferably, the deformation sensors are implemented as strain gauges, as resistance sensors, as piezoelectric strain gauges or as Bragg sensors.

Preferably, the first deformation sensor is arranged at the side of the first layer that faces toward the second layer, and the second deformation sensor arranged at the side of the second layer that faces toward the first layer. Alternatively, the first deformation sensor is embedded in the first layer and/or the second deformation sensor is embedded in the second layer. In both cases, the deformation sensors can be protected from environmental influences, and reliable operation of the deformation sensors ensured. The safety and the availability of the electric vehicle can thereby be increased, since failure of the deformation sensors can be reliably prevented.

In one preferred embodiment, the protective plate is arranged at a distance from the battery housing. As a result, damage or deformation of the protective plate does not directly lead to stress on the battery, so that the damage or deformation can be allowed up to a certain extent without safety measures having to be introduced as a result of a damaged battery.

A third layer is preferably arranged between the first layer and the second layer, wherein the third layer is made of a deformable material. In a preferred embodiment, the third layer is made of a structural foam. The third layer has a predefined stiffness and strength, so that with knowledge of the deformations of the first and of the second layer from the sensor signals of the deformation sensors, and the stiffness of the first, second and third layers, the strength of the impact of the object on the protective plate can be ascertained, and the damage to the battery can thereby be detected. In addition, the third layer serves to attenuate the impacts on the protective plate, as the structural foam exhibits a relatively high damping.

In one preferred embodiment, the first layer and the second layer are manufactured from a fiber-reinforced plastic. The first and the second layers thereby have a relatively high strength, whereby a relatively high protection against damage to the battery by the protective plate can be provided.

The deformation detection device preferably comprises an evaluation unit that is operatively connected to the at least one deformation sensor. The evaluation unit serves to evaluate the signals of the deformation sensors, wherein the evaluation unit, for example, generates a warning signal to the driver and/or other road users, makes an emergency call to the fire service and/or introduces predefined safety measures at the electric vehicle.

Through such a design, critical damage to the protective plate can reliably be detected in a simple manner, and only in the event of real, critical damage to the battery are measures introduced that restrict or entirely prevent further travel with the electric vehicle.

BRIEF DESCRIPTION OF THE DRAWINGS

An exemplary embodiment of the invention is explained in more detail with reference to the drawings.

DETAILED DESCRIPTION OF THE INVENTION

Figure 1:
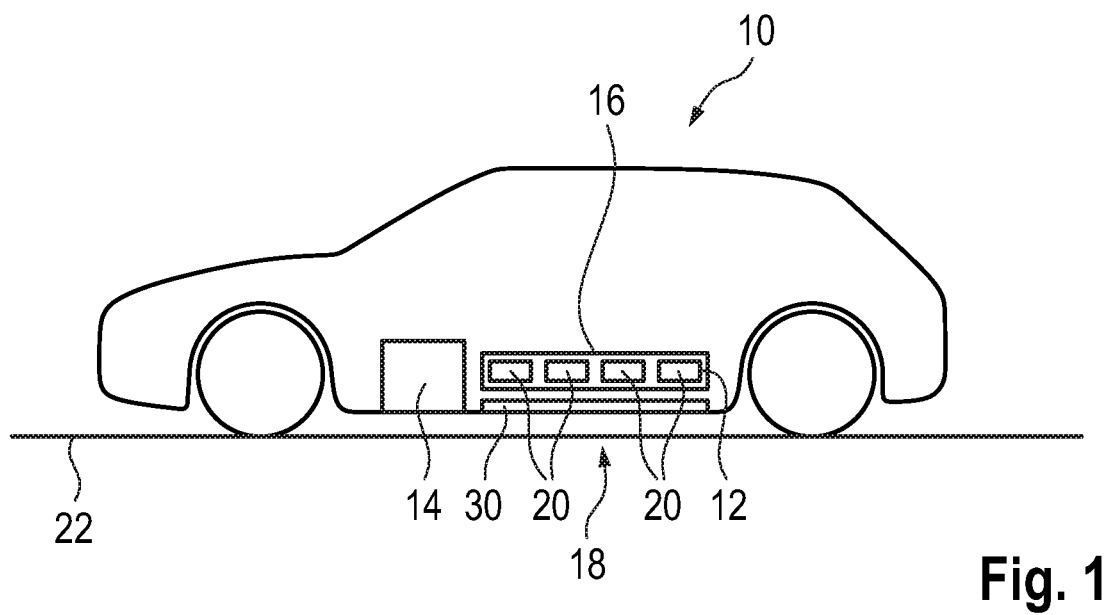
FIG. 1 shows a schematically illustrated electric vehicle.

FIG. 1 shows a schematic illustration of an electric vehicle 10 that comprises a battery 12 and a drive unit 14. The battery 12 serves to store electrical energy and to supply the drive unit 14 with electrical energy when the electric vehicle 10 is in driving operation.

The battery 12 comprises a battery housing 16, and is arranged at the underbody 18 of the electric vehicle 10. A multiplicity of battery cells 20 are arranged in the battery housing 16, and are separated from the external environment in a fluid-tight manner by the battery housing 16, and thereby protected from environmental influences by the battery housing 16. A protective plate 30 is arranged underneath the battery 12, i.e. between the battery 12 and a roadway 22. The protective plate 30 is fastened to a vehicle bodywork, and entirely covers the battery 12 as far as the roadway 22 is concerned.

The purpose of the protective plate 30 is that when the electric vehicle 10 is in driving operation, an object lying on the roadway that is projected upward strikes the protective plate 30. The battery 12, and the battery housing 16, are thereby protected by the protective plate 30 against objects that are projected upward, whereby the risk of damage to the battery 12 is reduced.

In spite of the protective plate 30, the battery 12, and in particular the battery cells 20, can be damaged by objects that are driven over or that are lying on the roadway 22 and are projected upward, in that the protective plate 30 deforms heavily or is penetrated.

The driver of the electric vehicle 10 must be informed as quickly as possible if the battery cells 20 are damaged, and/or corresponding measures must be introduced in order in particular to prevent a fire in the battery 12 or even in the entire electric vehicle 10.

Figure 2:
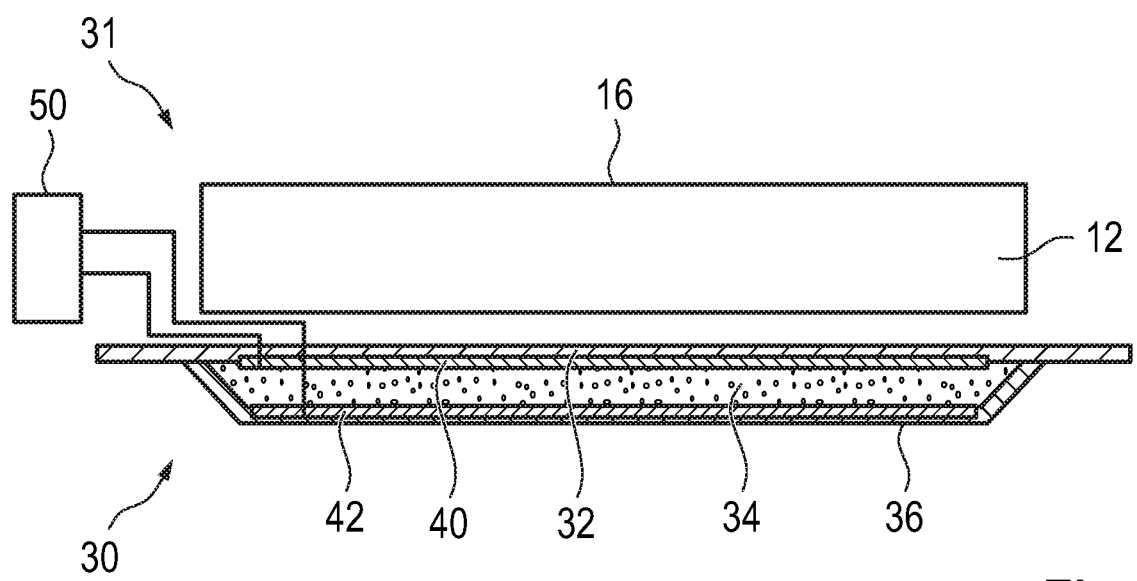
FIG. 2 shows an embodiment of a battery arrangement.

Possible damage to the battery 12 is acquired by a deformation detection device 31. FIG. 2 shows such a deformation detection device 31 that is arranged at the protective plate 30. The protective plate 30 is made of multiple layers, and comprises three layers 32, 34, 36. When the protective plate 30 is assembled, the first layer 32 is arranged closest to the battery. The protective plate 30 is fastened to a bodywork of the electric vehicle 10 by the first layer 32, namely by way of the side segments. The second layer 36 is arranged at a side of the protective plate 30 that faces toward the roadway 22. The second layer 36 is thus the layer that deforms first upon the impact of an object. The third layer 34 is arranged between the first layer 32 and the second layer 36, and entirely fills the space between the two layers 32, 36. The first and second layers 32, 36 are made of a fiber-reinforced plastic, and thereby have a relatively high strength. The third layer 34 is made of a structural foam, wherein the original material of the structural foam is filled into the space between the two layers 32, 36, and then foamed.

The deformation detection device 31 comprises two deformation sensors 40, 42 and an evaluation unit 50. The evaluation unit 50 is connected in terms of signals to the deformation sensors 40, 42, wherein the evaluation unit 50 receives the signals of the deformation sensors 40, 42, evaluates them and introduces appropriate measures such as, for example, switching the battery 12 off or transmitting a message to the driver regarding the damage to the battery 12. A first deformation sensor 40 is arranged at the first layer 32, wherein the first deformation sensor 40 is arranged at a side of the first layer 32 that faces toward the second layer 36, i.e. between the first and the third layer 32, 34, whereby the first deformation sensor 40 is protected from environmental influences. A second deformation sensor 42 is arranged at a side of the second layer 36 that faces toward the first layer 32, i.e. between the second layer 36 and the third layer 34. Both deformation sensors 40, 42 extend over the full surface of the protective plate 30, wherein the deformation sensors 40, 42 are divided into a multiplicity of segments, whereby the deformation can be localized.

When there is an impact of an object on the protective plate 30, a deformation of the protective plate 30 caused thereby is acquired by the deformation sensors 40, 42. Depending on the force of the impact of the object, either only the second layer 36 and, possibly, the third layer 34 are deformed, or all the layers 32, 34, 36. The impact of the object here can be slight enough that only the second layer 36 is deformed, and only the second deformation sensor 42 acquires a deformation. In spite of the deformation of the protective plate 30, immediate measures do not have to be taken, since damage to the battery 12 or to the battery housing 16 is not to be expected. In the event of the impact of an object with a great force, all the layers 32, 34, 36 deform, whereby, with knowledge of the stiffnesses of the individual layers 32, 34, 36 and the ascertained deformation of the individual layers 32, 36, the stress acting on the battery 12 can be estimated. On this basis it is possible to estimate whether a critical stress is present at the battery 12, and whether appropriate measures have to be introduced.

The availability of the electric vehicle 10 can be significantly increased by such a design of the deformation detection device 31, since the electric vehicle 10 can continue to be used for the usual driving operation with slight damage to the protective plate 30, and only in the case of critical damage to the protective plate 30 and the battery 12 must it be switched off or immediately brought to the workshop.

Constructive embodiments other than the embodiments described are also possible and fall within the protective scope of the main claim.

What is claimed is:

1. A battery arrangement for an electric vehicle, said battery arrangement comprising:
    a battery assembly comprising a battery housing and a plurality of battery cells arranged in the battery housing,
    a multi-layer protective plate arranged on a side of the battery assembly that faces toward a roadway, the multi-layer protective plate having multiple layers and comprising at least one first layer and one second layer that is separate from the first layer, and
    a deformation detection device comprising at least one deformation sensor arranged at the protective plate,
    wherein the deformation detection device comprises a first deformation sensor and a second deformation sensor, wherein the first deformation sensor is arranged at the first layer of the multi-layer protective plate and the second deformation sensor is arranged at the second layer of the multi-layer protective plate.

2. The battery arrangement as claimed in claim 1, wherein the first deformation sensor and/or the second deformation sensor are divided into different segments.

3. The battery arrangement as claimed in claim 1, wherein the deformation sensors are implemented as strain gauges, as resistance sensors, as piezoelectric strain gauges or as Bragg sensors.

4. The battery arrangement as claimed in claim 1, wherein the first deformation sensor is arranged at a side of the first layer that faces toward the second layer, and the second deformation sensor is arranged at a side of the second layer that faces toward the first layer.

5. The battery arrangement as claimed in claim 1, wherein the first deformation sensor is embedded in the first layer and/or the second deformation sensor is embedded in the second layer.

6. The battery arrangement as claimed in claim 1, wherein the protective plate is spaced apart from the battery housing.

7. The battery arrangement as claimed in claim 1, wherein a third layer is arranged between the first layer and the second layer, and wherein the third layer is composed of a deformable material.

8. The battery arrangement as claimed in claim 7, wherein the third layer is made of a structural foam.

9. The battery arrangement as claimed in claim 1, wherein the first layer and the second layer are composed of a fiber-reinforced plastic.

10. The battery arrangement as claimed in claim 1, wherein the deformation detection device comprises an evaluation unit that is operatively connected to the at least one deformation sensor.

11. An electric vehicle comprising the battery arrangement as claimed in claim 1.

* * * * *